United States Patent [19]

Fishering et al.

[11] 4,290,161
[45] Sep. 22, 1981

[54] AUTOMATED CARWASH BRUSH ASSEMBLY

[76] Inventors: Ronald G. Fishering; Peter M. Fishering, both of 1344 Primrose Ave., Rialto, Calif. 92376

[21] Appl. No.: 50,185

[22] Filed: Jun. 20, 1979

[51] Int. Cl.³ .............................................. B60S 3/06
[52] U.S. Cl. .............................. 15/53 AB; 15/DIG. 2
[58] Field of Search ........... 15/DIG. 2, 53 A, 53 AB, 15/97 B

[56] References Cited

U.S. PATENT DOCUMENTS

| | | | |
|---|---|---|---|
| 3,581,334 | 6/1971 | Follis | 15/53 AB |
| 3,772,724 | 11/1973 | Wilson | 15/53 AB |
| 3,818,531 | 6/1974 | Saunders | 15/53 AB |
| 3,926,663 | 12/1975 | Gray | 15/DIG. 2 |
| 3,969,782 | 7/1976 | Williams | 15/53 AB |

FOREIGN PATENT DOCUMENTS 2126347  1/1972  Fed. Rep. of Germany ... 15/DIG. 2

*Primary Examiner*—Edward L. Roberts
*Attorney, Agent, or Firm*—Poms, Smith, Lande & Rose

[57] ABSTRACT

The brush assembly includes a brush mounted at the end of an arm member which moves the brush to various locations along the car passing through the carwash. The arm member comprises a single arm assembly having an outside and inside arm connected at a pivot. A support extends upward from a base. One end of the inside arm is attached to the support, and the arm assembly pivots above and close to the base. The brush extends upward from the end of the outside arm opposite the intermediate pivot and is rotated by a motor. A fluid control system may pivot the inside arm with respect to the base and the outside arm with respect to the inside arm. The support for the arm on the base is angled and the brush is angled to assist in pivoting the arm and rotating parts of the brush along the car. In one embodiment, the fluid driving system has two piston chamber systems, the first between the base and the inside arm, and the second between the inside arm and the outside arm, and a spring urges the arm assembly toward the car. Movement of the arms transfer fluid between the chambers to assist moving the arms. Alternatively, the fluid control system may merely slow opening of the arms. A portion of the water which is sprayed on the brush may be injected between the brush and its bearing to lubricate the rotating brush.

15 Claims, 6 Drawing Figures

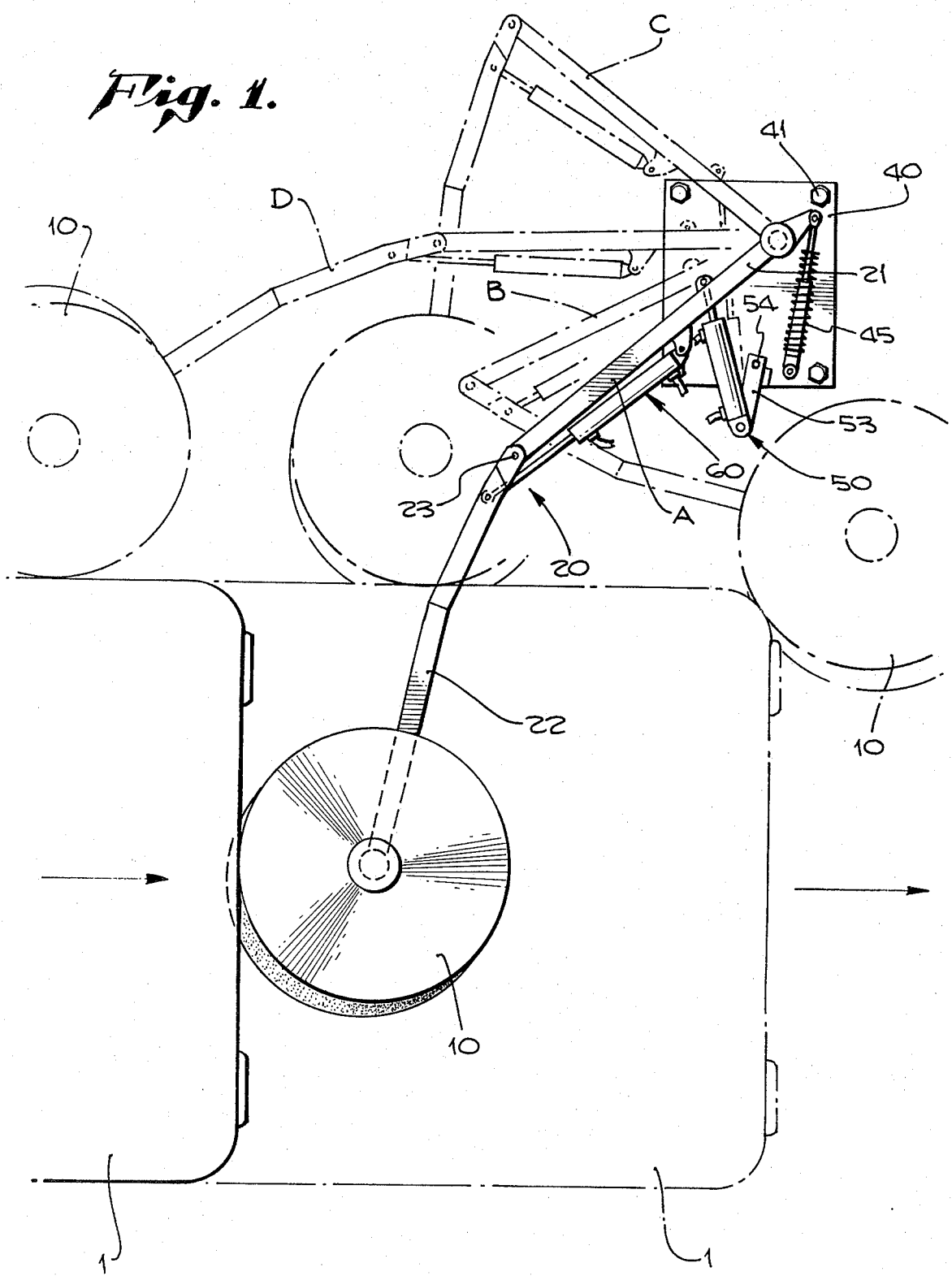

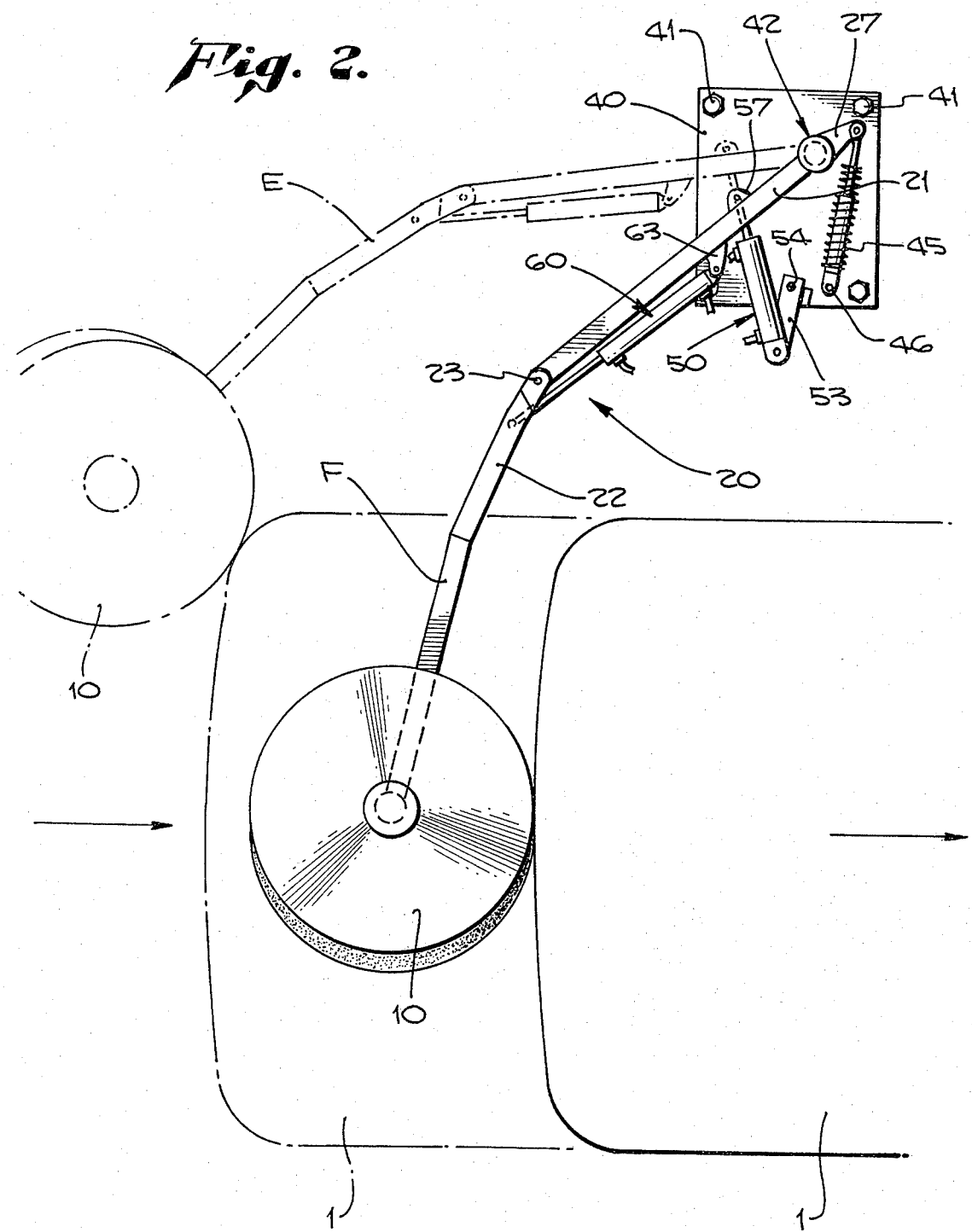

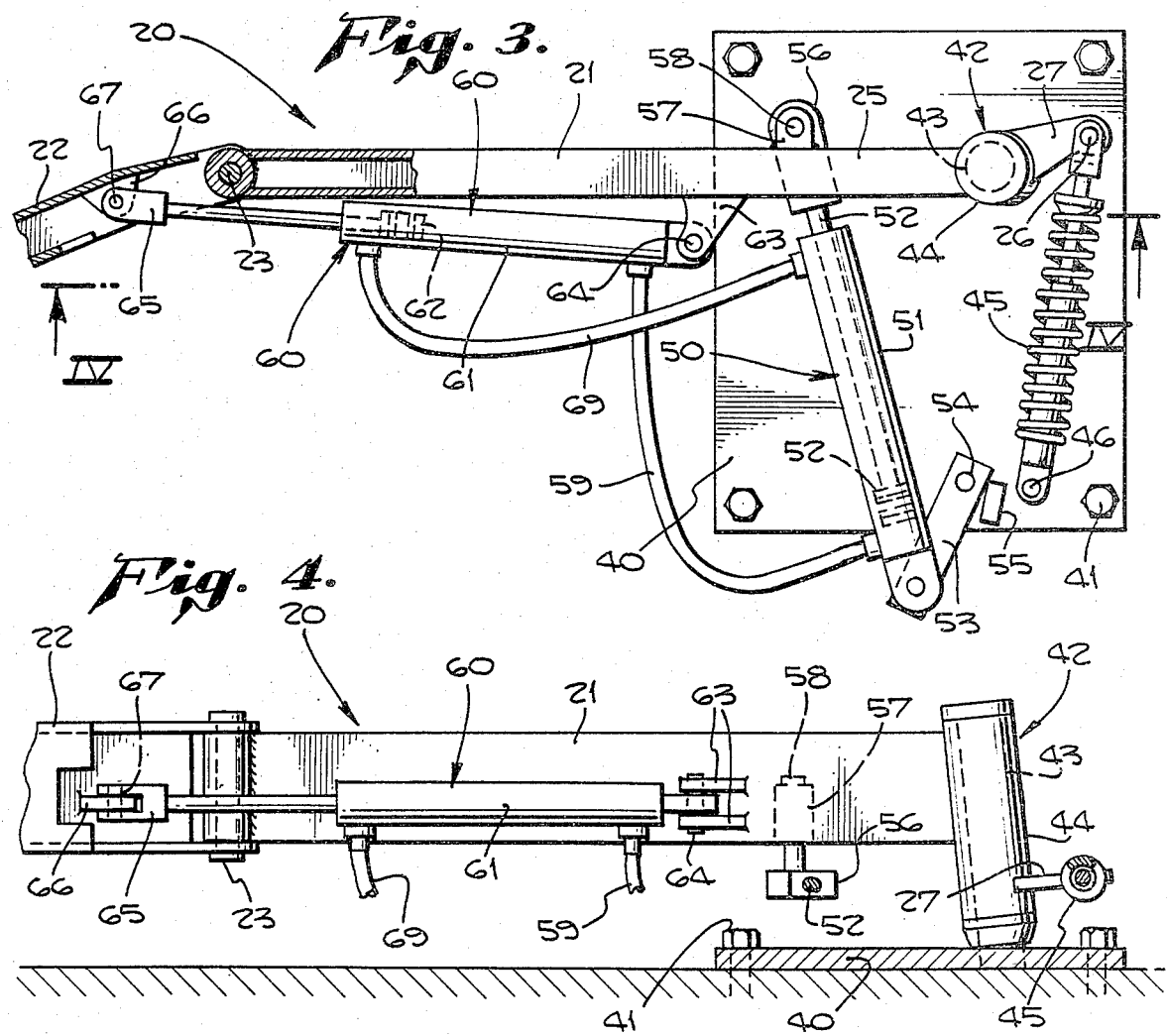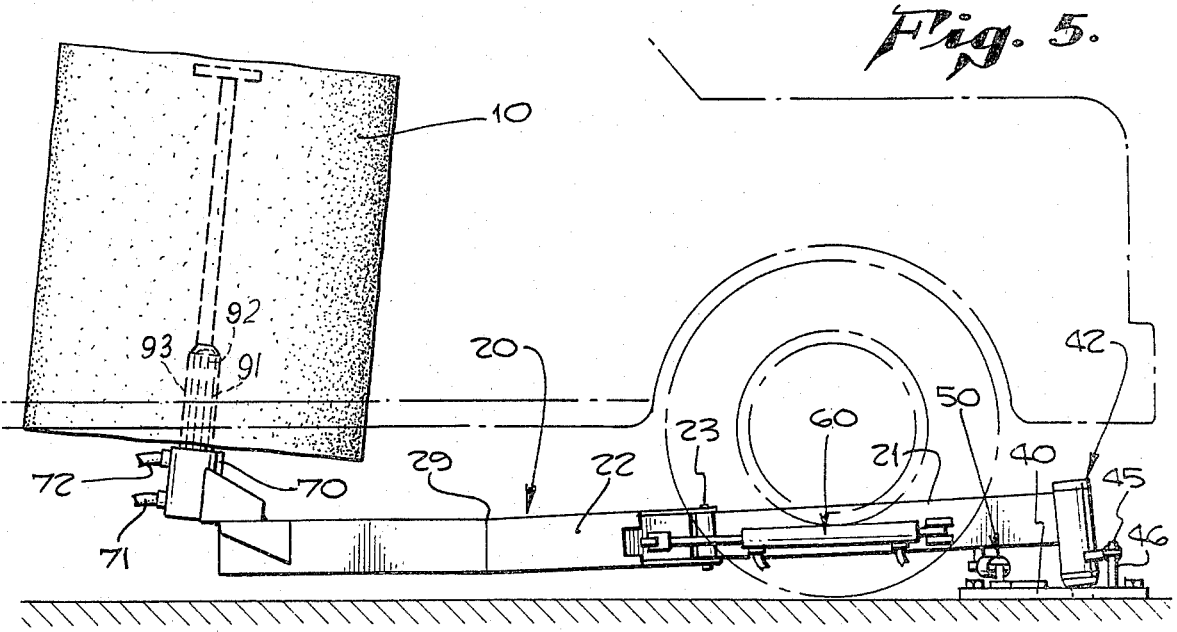

AUTOMATED CARWASH BRUSH ASSEMBLY

FIELD OF THE INVENTION

This invention relates to carwash equipment, and more particularly to those types that automatically wash cars by moving motorized brushes around the periphery of the car.

BACKGROUND OF THE INVENTION

Carwash wraparounds are generally complex devices having elaborate control systems. Wraparounds were developed so that one brush can replace many of the rotating brushes used in a carwash. A wraparound is capable of washing the front of the car, moving along one side of the car as the car passes the brush assembly and then wrapping around the rear of the car to wash the rear.

In the past, the wraparounds have been mounted on large stands with a pair of arms extending from the top and bottom of the stands with a rotating brush supported between the top and bottom arms. These systems tend to be extremely bulky, and the necessity of top and bottom arms doubles the number of bearing surfaces requiring maintenance and contributing to possible system failure.

It has been proposed that the bottom arm could be removed with the brush supported from the top arm. However, these systems still need a large support from which to hang the brush out of the path of the car.

Another concern of previous carwash brush wraparound designs has been in the control mechanism. Previous wraparounds required complicated control systems to move the brushes from the front to the sides of the car. Because of their design complexities, the systems were expensive and required extensive maintenance.

Another problem with prior art wraparounds involves movement of the brush and arm. Force is needed to accelerate the brush, but it is advantageous to keep the driving mechanism small for cost and size reasons.

Another problem has been the effectiveness of washing the bottom of the sides of a car. These frequently curve inside, and such parts as the fender bottom and the top of the side windows may not be reached by the brush of prior art brushes. The profile of the side of a car also changes from front to rear, and it has been difficult to accomodate the changes.

Another problem, although minor, has been in lubricating the brush. Because it is constantly rotating and is subject to large volumes of water and detergent, it must be lubricated relatively frequently.

Therefore, one object of the present invention is to simplify the wraparound brush system of a carwash. Simplification, according to the present objects involves eliminating as much of the arm hardware as possible as well as reducing the size and complexity of the driving mechanism and the control system. Another object of the present invention has been to increase the efficiency with which the wraparound brush moves between various positions at the same time utilizing as simple a drive system as possible. Another object of the present invention is to provide a carwash system that will effectively wash the bottoms of the sides of cars especially the rocker panel area and compensate for changes in the profile of the side. These objects also lead to an additional object of reduction of maintenance to the automated wraparound.

SUMMARY OF THE INVENTION

The present invention, in one illustrative embodiment, involves the scrubbing of the front, side and rear areas of a car by a rotating brush located upon an arm pivotally attached to a base mounted to the floor of the carwash facility. Such a brush and its arm mechanism are known as a wraparound. The arm is hinged at its midsection in order that it can move the brush along the front, then along the side, and then along the rear of the car.

There is only a single arm mechanism, and its few supporting components are close to the floor of the carwash facility so that it does not interfere with the side of the automobile. There areother reasons why the arm is close to the floor, as will be explained later.

The base has an upwardly-extending support member which is the sole element by which the arm is attached to the base. The member is vertically offset by an angle of approximately 6 degrees. This slight tilt allows the force of gravity to assist the driving system to move the arms and to push the arm towards the car and change the brush orientation at various locations along the car.

The arm member which supports the brush is made of two hinged arms, an inside arm and an outside arm. The inside arm pivots on the base at the support member. The rotating brush attaches to a shaft extending upward from the outside end of the outside arm. This shaft is angled about 6° from the vertical to assist the bottom of the brush to was hard-to-reach areas such as the rocker panel, the bottom, and the side windows of the car.

The positions of the arm member relative to the base and the inside and outside arms relative to each other are controlled by one or more hydraulic actuators, a spring and by the friction between the rotating brush and the car. If a pair of actuators are used, one actuator connects the inside and outside arms together, and the other actuator connects the base to the inside arm. The actuators each comprise a cylinder with fluid inside in which a piston and push rod assembly move. The fluid above and below the piston in each cylinder is connected to the corresponding fluid in the other cylinder by a pair of hoses. This interconnection allows the actuators to act with each other and with a drive spring on the base attached to the arm member to properly position the brush on the arm against the car as the car passes by the brush.

The spring initially positions the brush in front of the car as it approaches. When contact is made with the arm, the car pivots the arm member at its midsection. As a result, the piston in the actuator between the inside and outside arms pushes fluid into the other actuator. This causes the piston in the other actuator to urge the inside arm away from the car to move the brush along the front of the car. When the brush reaches the front corner of the car the spring on the base re-exerts force upon the arm, thus causing the piston in the actuator between the base and the inside arm to push the fluid above it back into the other actuator and to restraighten the arms. The spring forces the brush against the side of the car until the rear corner clears the brush. Then the spring pushes the arm so that the brush travels along the rear of the car. The brush then loses contact with the car but it is in front of the next approaching car.

In another embodiment, the actuator between the base and the inside arm is replaced by a reservoir, and only the hose on the extended end of the inside cylinder connects to the reservoir. A check valve on the hose restricts fluid flow in one direction through the hose. In this embodiment, only the automobile's forces on the brush and the outside arm move the inside arm, and the rotating brush pulls the brush along the side of the car. The check valve prevents the arms from opening too quickly which would affect washing the side of the car.

In still another embodiment, the single hydraulic cylinder is replaced by a shock absorber that permits the arms to close but slows the opening of the arms. If combined with a spring, similar to a door closer, the shock absorber might also urge the arms apart.

In accordance with a final aspect of the invention, the rotating brush is supported upon the moving arm by a bearing through which water is circulated. The water provides lubrication and thereby greatly reduces the amount of maintenance required on the brush assembly.

Other features and advantages of the present invention will become apparent from a consideration of the following detailed description and from the accompanying drawings.

BRIEF DESCRIPTION OF THE DRAWINGS

FIG. 1 is a plan view of the carwash system of one embodiment of the present invention, depicting its operation as it brushes the front end of a car.

FIG. 2 shows the carwash system brushing the rear of the car.

FIG. 3 is a detailed top view, partly in cross-section, of the base and arm assembly shown in FIG. 1.

FIG. 4 is a side view of the base and arm assembly of FIG. 2 taken along lines IV—IV in FIG. 3.

FIG. 5 is a side view, partly in cross-section, of the arm and brush system of the present invention.

DETAILED DESCRIPTION OF THE IMPROVED EMBODIMENT

Figure 6:
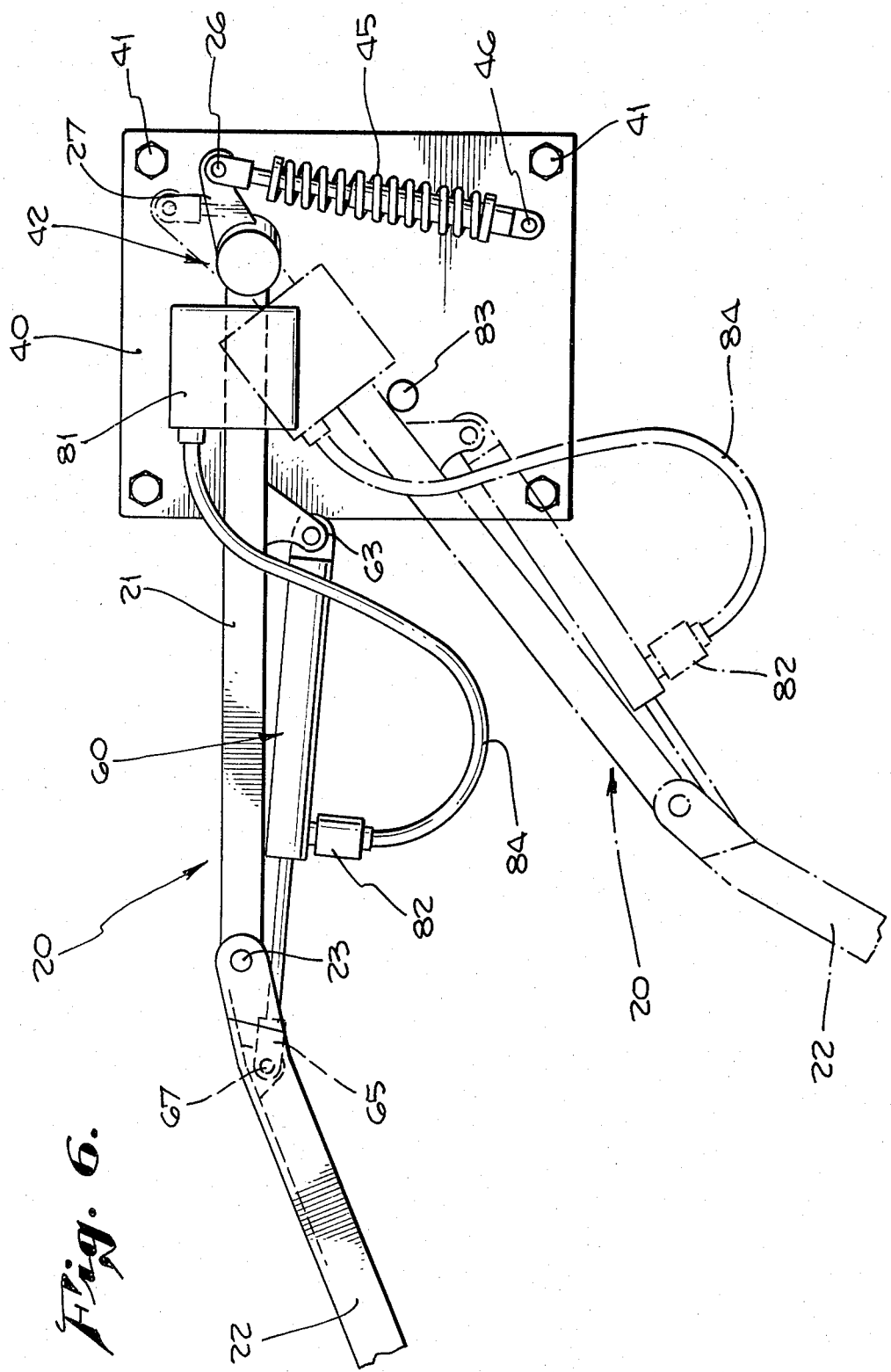
FIG. 6 is a detailed top view, partly in section of the base and arm assembly of another embodiment of the carwash system of the present invention.

The improved brush assembly for a carwash has a brush 10 mounted at the end of an arm member 20 to move the brush to various locations along a car 1 passing through a carwash. This is shown in the first exemplary embodiment in FIGS. 1, 2 and 5.

The assembly includes a base, which in the first exemplary embodiment is a metal plate 40 (FIGS. 3-5) secured to the carwash floor by bolts 41. Arm member 20 comprises a single arm assembly comprising an inside arm 21 and an outside arm 22. Arms 21 and 22 are pivotally mounted with respect to each other at an intermediate pivot 23. Brush 10 extends upward from the outside end of the arm 10.

Support means 43 extends upward from base 40 and is attached to the end 25 of the inside arm 21 opposite intermediate pivot 23 for pivotally mounting the arm assembly above the base so that the arm assembly pivots in a nearly horizontal plane above and adjacent the base. The bottom of the arm assembly should be below the bottom of the car so that the arm does not interfere with the car, and so that the bottom of the brush will wash the lower portion of the car. In the first exemplary embodiment, support means 42 comprises a post 43 attached to base 40. A sleeve 44 mounts over post 43 to pivot therearound. Inside arm 21 is fixed to sleeve 44.

Drive means may be provided to pivot the inside and outside arms with respect to each other and may pivot the arm assembly about the base to urge the brush against various portions of a car passing through the carwash.

In the first embodiment, the drive means comprises a pair of fluid driving means. The first fluid driving means 50 extends between the base 40 and the inside arm 21, and the second fluid driving means 60 extends between the inside arm 21 and the outside arm 22. The first fluid driving means 50 includes a first chamber 51 and a first piston 52 mounted in the chamber. The piston chamber combination extends between base 40 and inside arm 21. In this exemplary embodiment, chamber 51 is attached to linkage means 53 which is pivotally mounted at 54 to base 40. The linkage changes the angle between first fluid driving means and arm 21 when the arm pivots on the base. Piston 52 is attached through bracket 56 to flange 57 by means of pin 58. The second fluid driving means 60 comprises a second chamber 61 having a second piston 62 mounted therein. The second fluid driving means 60 extends to flange 63 of inside arm 21 by means of a pivot pin 64. Piston 62 extends through bracket 65 to flange 66 by means of pivot pin 67.

Yielding means are also provided which extend between arm assembly 20 and the base for urging the arm and the brush in the path of the front of the vehicle passing through the carwash. In the exemplary embodiment, the arm member 20 is constantly biased against the car by a shock absorber-type spring 45 (FIGS. 1, 2 and 3). Spring 45 connects to the base 40 and the inside arm 21, being pivotally attached to the base at pin 46 extending upwardly from the base 40 and attached to the inside arm 21 at pin 26 through bracket 27 extending outwardly from the cylindrical sleeve 44. Spring 45 pushes bracket 27 thereby urging arm assembly 20 counterclockwise (FIGS. 1, 2 and 3) to urge the brush against the car.

In the first embodiment, first conductor extends between a retracted end of second chamber 61 to a retracted end of first chamber 51 to conduct fluid between the first chamber and the second chamber. In this exemplary embodiment, the retracted end of the chamber is that end of the chamber at which the piston is located at its most inside position. For example, in FIG. 3, piston 52 is at the retracted position whereas piston 62 is at the extended position, the opposite of the retracted position. In the exemplary embodiment, the conductors are hydraulic hoses 59 and 69, the first conductor extends between the retracted end of chamber 51 to the retracted end of chamber 61. The hydraulic fluid within each chamber is conducted through conductors 59 and 69.

Referring to FIG. 1, when a car passing through the carwash contacts brush 10 (Position A), it pivots outside arm 22 about pivot point 23 with respect to inside arm 21. As shown in FIG. 3, this will push piston 62 from the extended position in chamber 61 toward the retracted position thereby forcing fluid in chamber 61 into conductor 59 to the retracted end of chamber 51. This action urges piston 52 toward the extended position or out of chamber 51 which pushes inside arm 21 clockwise around support means 22, from position A in FIG. 1 toward position B. A second conductor 69 extends between the extended ends of each chamber 51 and 61. It conducts the fluid from the extended end of first chamber 51 to the extended end of second chamber 61 to urge second piston 62 to the retracted position when the first piston 52 moves to the extended position.

Referring again to FIG. 1 in the first exemplary embodiment, as the car 1 contacts brush 10 as spring 45 urges the arm assembly into the path of the car. As the car pivots arm 22 inward or counterclockwise about pivot point 23, the aforementioned fluid movement takes place urging inside arm 21 clockwise until brush 10 reaches the front corner of the car, position B in FIG. 1. In position A, stop 55 contacts linkage 53 to prevent the swinging of inside arm 21 beyond a predetermined point on base 40. It is appreciated that as the brush moves from position A to position B it travels along the front of the car to wash it.

As the brush moves slightly beyond its position B orientation, the force pushing piston 62 in second chamber 61 will be released because there will be no force from the front of the car. Spring 45, however, is still urging arm 21 toward the car which pushes piston 52 toward the retracted position in chamber 51 which initiates movement of piston 62 and chamber 61 thereby moving the arm assembly through position C and D in FIG. 1. The rotation of the brush also pulls the brush along the side of the car. This causes the brush to move along the side of the car and at the same time, the side of the car moves relative to the brush so that the entire side of the car can be washed.

It has been determined that if two actuations are used to control movement of the arms, the amount of fluid in each chamber should be as follows. When each piston is in the middle of its respective chamber, the portion between the piston and the retracted end should be entirely filled with fluid while the remaining portion of the chamber should be only half filled.

As the rear of car 1 passes by the brush 10, as shown in FIG. 2, spring 45 continues to urge the arm in a counterclockwise direction. The brush therefore travels along the rear of the car until piston 52 is fully retracted in chamber 51 so that the arm assembly 20 can no longer move. This is shown in the movement in FIG. 2 of the arm assembly from position E to position F. In the latter position, the brush is properly located to encounter the next automobile passing through the carwash.

Also, as shown in FIG. 4, the support means 42 extends upward from base 40 at an angle to the vertical. This angle has been found to be best at approximately 6 degrees. The angle allows gravity to assist spring 45 in swinging the arm assembly from position D in FIG. 1 through positions E and F in FIG. 2 adding a pendulum effect to the arm assembly.

In the second embodiment, the first fluid driving means is replaced by a hydraulic reservoir. The inside arm is driven by the outside arm which is closed by the car. The reservoir 81 is preferably mounted on the inside arm. The connectors of the first exemplary embodiment are replaced by a single hose 84 from the extended end of the second chamber to the reservoir. A check valve 82 slows the flow of fluid from the chamber to the reservoir.

In operation, the spring 45 still urges the arm assembly to position A. A stop 83 prevents the arm from moving too far counterclockwise. As the car pushes the brush and outside arm 22 counterclockwise about the center pivot 23, arm 22 moves piston 62 into second chamber creating suction from the reservoir. Check valve 83 does not interfere with fluid flow. As the brush reaches the corner of the car (position B), the rotation of the brush against the side of the car and the force of spring 45 urges the outside arm to the open position (position D). Check valve 82 restricts fluid flow showing the opening of the arms so that the brush travels slowly along the side of the car for effective cleaning. Too rapid movement would brush the side too quickly, and it would tend to pull or jerk the brush away from the side of the car. The retracted end of the chamber would be open to the environment to eliminate back pressure on the piston.

In still another embodiment, the hydraulic system is replaced by a pneumatic one. The reservoir and all hoses would be eliminated, but the check valve would cover one of the chamber's openings. The check valve would permit the arms to close without interferences but slow the openng of the arms. Pneumatic door closers operate similarly but backwards from the present system. That is, a door opener slows closing while the present system retards opening. The spring on a door closer may be retained, reversed or eliminated.

The brush is also mounted at an angle with respect to the outside arm, and the angle is optimized at approximately 6 degrees. The combined angles greatly assist in washing the car. In position A, the tilt allows the brush to reach beneath the bumper. This tilt continues beyond the front tire (position C) where the sides of a car tends to curve inwardly, and the bottom of the brush extends to wash this area. Also, because the side is not wide in front of the side windows, the top of the brush need not reach the plane of the car. At the side windows, however, the brush is in position D where the tile allows the brush to reach the top of the windows. Because of the flexibility of the bristles of the brush, the bottom of the side is also reached. Thus, the angles that the brush assumes assists in washing the car.

It will also be recognized that because of the angle of support means 42, the outside arm 22 has a bend at 29 (FIG. 5), and the portion of arm 22 from bend 29 to the brush end is generally horizontal.

The angle of the support 42 also assists in moving the arm assembly. The arm assembly travels through an arc in which the brush is higher along the side of the car than at the ends and in which the car pushes the brush to the higher position (B, C and D) overcoming gravity. Gravity thus assists spring 45 to bring the brush to position F at the rear of the car and to stay on the rear of the car while the car is moving away from the assembly.

Brush 10 is driven by a hydraulic motor 70 that is powered through the hydraulic line 71, which, although not shown, connects back to the base in the exemplary embodiment along the arm mechanism where the hydraulic pressure can be fed into it. A second line 72 carries water to brush 10 to keep it wet. A portion of the fluid from line 72 may be directed into the bearing on which the brush rotates to decrease the friction in the bearing. As shown in FIG. 5, brush 10 has a sleeve 93 mounted on bearing 92. A tube 91 (schemetically) which is connected to tube 72 extends into bearing 92 and interjects liquid into bearing 92. This is especially effective where the water contains soap or detergent which can act as a lubricant.

In the foregoing description of the present invention, a preferred embodiment of the invention has been disclosed. It is to be understood that other mechanical and design variations are within the scope of the present invention. Thus, by way of example and not of limitation, a different type of arrangement could be used to bias the arm mechanism toward the automobile, and a different method could be utilized for directing the hydraulic fluid between the two fluid driving means.

I claim:

1. An improved brush assembly for a carwash having a rotating brush mounted at the end of an arm member, the arm member moving the brush to various locations along a car passing through the carwash, the improvement comprising:
   a base;
   an arm member comprising a single arm assembly comprising an inside and an outside arm pivotally mounted with respect to each other at an intermediate pivot; and
   support means extending upward from the base at an angle to the vertical and attached to the end of the inside arm assembly opposite the intermediate pivot for pivotally mounting the arm assembly above the base so that the arm assembly pivots in a near horizontal plane above and adjacent the base, the brush extending upward from the arm member.

2. The improved brush assembly of claim 1 wherein the angle of the support means to the base is approximately 6°.

3. The improved brush assembly of claim 2 wherein the brush is mounted at an angle of approximately 6° with respect to the outside arm.

4. The improved brush assembly of claim 1 wherein the brush is mounted upward at an angle away from the perpendicular with respect to the outside arm.

5. The brush assembly of claim 1 further comprising drive means to pivot the inside and outside arms with respect to each other and to pivot the arm assembly about the base to urge the brush against various portions of a car passing through the carwash, wherein the drive means comprises a first fluid driving means extending between the base and the inside arm and a second fluid driving means extending between the inside and outside arms.

6. In the brush assembly of claim 1, the improvement further comprising drive means to pivot the inside and outside arms with respect to each other and to pivot the arm assembly about the base to urge the brush against various portions of a car passing through the carwash, the drive means including a first chamber having a first piston mounted therein and extending between the inside arm and the base and a second chamber having a second piston mounted therein and extending between the inside arm and the outside arm, the first and second chambers each containing fluid, yielding means extending between the arm assembly and the base for urging the arm and the brush in path of the front of a vehicle passing through the carwash, whereby the passing car pivots the outside arm toward the inside arm to move the second piston in the second chamber, a first conductor between a retracted end of the second chamber to a retracted end of the first chamber to conduct fluid between the first chamber and the second chamber whereby when the outside arm is forced to pivot toward the inside arm the movement of the second piston to the retracted position forces fluid through the first conductor to the first chamber to urge the first piston to the extended position to urge the inside arm away from the path of the car.

7. The improved brush assembly of claim 6 further comprising a second conductor between the extend ends of each chamber for conducting fluid from the extended end of the first chamber to the extended end of the second chamber to urge the second piston to the retracted position when the first piston moves to the extended position.

8. The improved brush assembly of claim 6 further comprising linkage means between the first chamber and the base for changing the angle between the first chamber and first piston and the inside arm when the inside arm pivots on the base.

9. The improved brush assembly of claim 8 comprising stop means on the base in the path of the linkage means for preventing movement of the linkage means beyond a certain point to limit movement of the inside arm under urging of the yielding means.

10. The improved brush assembly of claim 6 comprising stop means on the base in the path of the first chamber for preventing movement of the first chamber beyond a certain point to limit movement of the inside arm under urging of the yielding means.

11. The improved brush assembly of claim 1 further comprising a brush bearing on the outside arm for mounting the brush thereon, injecting means at the brush bearing for injecting water between the brush and the bearing for friction reduction.

12. The improved brush assembly of claim 1 further comprising control means between the inside and outside arms for permitting the inside and outside arms to pivot toward each other without impeding the movement and for impeding the pivoting of the inside and outside arms away form each other, wherein the control means comprises a chamber and a piston movable therein extending between the inside and outside arms whereby pivoting of the arms relative to each other moves the piston in the chamber, fluid within the chamber, check valve means for controlling the flow of fluid in one direction with respect to the chamber whereby the fluid flows unimpededly in one direction with respect to the chamber to permit the piston to freely move in the direction in which the outside arm urges the piston into the chamber and for impeding the flow of fluid in the other direction with respect to the chamber to impede the piston to slow the movement of the outside arm in the other direction, a reservoir for storing the liquid, and a single hose between the chamber and the reservoir for conducting the fluid therebetween, the check valve being mounted on the hose.

13. An improved brush assembly for a carwash having a rotating brush mounted at the end of an arm member, the arm member moving the brush to various locations along a car passing through the carwash, the improvement comprising:
   a base;
   the arm member comprising a single arm assembly comprising an inside and an outside arm pivotally mounted with respect to each other at an intermediate pivot; and
   support means extending upward from the base and attached to the end of the inside arm assembly opposite the intermediate pivot for pivotally mounting the arm assembly above the base so that the arm assembly pivots in a nearly horizontal plane above and adjacent the base, the support means including a support post extendng upward from the base at an angle to the vertical and a sleeve on the end of the inside arm assembly opposite the intermediate pivot, the sleeve extending over the support post for rotation therearound and wherein the outside arm has a bend, and the outside portion of the outside arm between the bend and the brush is generally horizontal.

14. The improvement of claim 13 wherein the brush is mounted at an angle to the outside portion of the outside arm.

15. The improvement of claim 13 wherein the brush is mounted at an angle to the vertical.

* * * * *